US012244093B2

(12) United States Patent
Tonomura

(10) Patent No.: US 12,244,093 B2
(45) Date of Patent: Mar. 4, 2025

(54) CONNECTOR WITH CAP AND MANUFACTURING METHOD OF THE CONNECTOR WITH CAP

(71) Applicant: YAZAKI CORPORATION, Tokyo (JP)

(72) Inventor: Hiroshi Tonomura, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 357 days.

(21) Appl. No.: 17/953,395

(22) Filed: Sep. 27, 2022

(65) Prior Publication Data

US 2023/0120982 A1 Apr. 20, 2023

(30) Foreign Application Priority Data

Oct. 18, 2021 (JP) ................................ 2021-170210

(51) Int. Cl.
*H01R 13/52* (2006.01)
*H01R 43/00* (2006.01)

(52) U.S. Cl.
CPC ....... *H01R 13/5213* (2013.01); *H01R 43/005* (2013.01)

(58) Field of Classification Search
None
See application file for complete search history.

(56) References Cited

U.S. PATENT DOCUMENTS 6,676,422 B1 * 1/2004 Baker .................. H01R 13/447 439/135

FOREIGN PATENT DOCUMENTS

JP 2013-74312 A 4/2013
JP 2013-176205 A 9/2013
WO WO-2019092749 A1 * 5/2019

* cited by examiner

*Primary Examiner* — Tho D Ta
(74) *Attorney, Agent, or Firm* — Sughrue Mion, PLLC

(57) ABSTRACT

A connector with cap includes a connector body and a cap formed of a plastic material that has plasticity before being cured and that cures under a predetermined condition, the cap being cured in a state where the cap is removably closing an opening of the connector body located on a side on which a mating connector is fitted. The connector with cap further includes a protective member formed of an insulating material and arranged inside the connector body on a side of the opening such that the protective member is positioned between the cap and the connector terminal, the protective member being configured to protect the connector terminal from contacting the plastic material.

9 Claims, 2 Drawing Sheets

CONNECTOR WITH CAP AND MANUFACTURING METHOD OF THE CONNECTOR WITH CAP

TECHNICAL FIELD

The present invention relates to a connector with cap in which an opening thereof located on a side for fitting with a mating connector is closed with a cap, and to a manufacturing method of the connector with cap.

BACKGROUND

Conventionally, a vehicle is mounted with various electronic devices, and a wire harness is arranged in the vehicle to transmit power and/or control signals to these electronic devices (see, for example, Patent Document 1). Depending on the presence or absence of a vehicle system, a connector at an end of the wire harness arranged inside the vehicle may be free with no mating connector fitted thereto. When the connector is free, its opening located on a side for fitting with the mating connector is closed with a cap in order to prevent water or a foreign object from entering this opening.

RELATED ART DOCUMENT

Patent Document 1: JP 2013-176205 A

SUMMARY OF THE INVENTION

Problem to be Solved by the Invention

The caps as described above must be prepared for the respective types of the connectors with different sizes and shapes. Most of the caps are made of resin, and preparing the caps for the respective types of the connectors requires molding dies corresponding to the respective types of the connectors, and it also takes time and effort, causing an increase in cost.

In view of the problem described above, an object of the present invention is to provide a connector with cap and a manufacturing method of the connector with cap which can reduce time and effort as well as cost related to manufacturing.

Solution to Problem

To solve the problem described above and achieve the object, the present invention provides, in a first aspect, a connector with cap including a connector body that includes a tube-shaped connector housing in which a connector terminal is accommodated, a cap formed of a plastic material that has plasticity before being cured and that cures under a predetermined condition, the cap being cured in a state where the cap is removably closing an opening of the connector body located on a side on which a mating connector is fitted, and a protective member formed of an insulating material and arranged inside the connector body on a side of the opening such that the protective member is positioned between the cap and the connector terminal, the protective member being configured to protect the connector terminal from contacting the plastic material.

Further, the present invention provides, in a second aspect, a manufacturing method of a connector with cap, including an applying step of applying, on a given application plate, a plastic material that has plasticity before being cured and that cures under a predetermined condition such that the plastic material extends broader than an opening of a connector body that includes a tube-shaped connector housing in which a connector terminal is accommodated, the plastic material being applied in a state before being cured, the opening being located on a side of the connector body on which a mating connector is fitted, a pressing step of pressing the plastic material before being cured applied to the application plate against the opening of the connector body so as to close the opening of the connector body in a state where a protective member is arranged between the plastic material and the connector terminal, the protective member being formed of an insulating material and being configured to protect the connector terminal from contacting the plastic material, and a curing step of curing the plastic material that is closing the opening and removing the application plate, thereby completing a cap that is cured in a state where the cap is removably closing the opening.

Advantageous Effect of the Invention

According to the connector with cap and the manufacturing method of the connector with cap described above, time and effort as well as cost related to manufacturing can be reduced.

BRIEF DESCRIPTION OF THE DRAWINGS

FIG. 2 is manufactured by the manufacturing method shown in FIG. 3.

DETAILED DESCRIPTION OF THE EXEMPLARY EMBODIMENT

The following will describe one embodiment of a connector with cap and a manufacturing method of the connector with cap. First, one embodiment of a connector with cap will be described.

Figure 1:
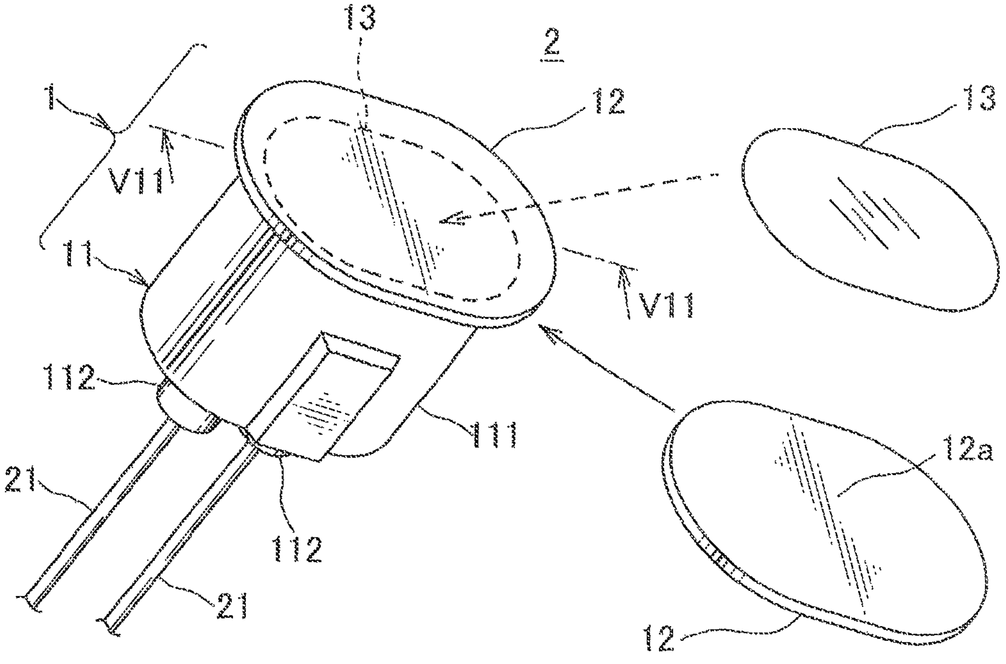
FIG. 1 is a schematic perspective view showing a connector with cap according to one embodiment.
Figure 2:
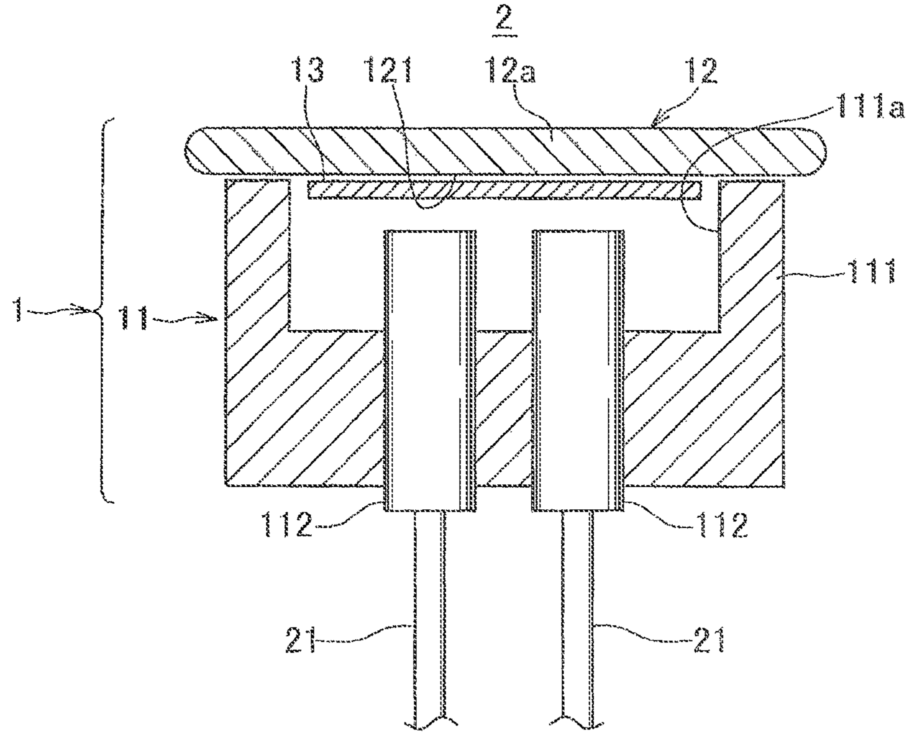
FIG. 2 is a schematic cross-sectional view showing a cross-section of the connector with cap shown in FIG. 1 along a line V11-V11 in FIG. 1.

FIG. 1 is a schematic perspective view showing a connector with cap according to one embodiment, and FIG. 2 is a schematic cross-sectional view showing a cross-section of the connector with cap shown in FIG. 1 taken along a line V11-V11 in FIG. 1.

A connector with cap 1 shown in FIG. 1 and FIG. 2 is an end connector for a wire harness 2 configured to be arranged inside a vehicle, and the connector with cap 1 includes a connector body 11, a cap 12 and a protective member 13. The connector with cap 1 is installed in the vehicle with its opening 111*a* closed with the cap 12 in order to prevent water or a foreign object from entering inside the connector body 11 when the connector with cap 1 is free and no mating connector is fitted thereto. On the other hand, when it is to be used by fitting a mating connector thereto, the cap 12 and the protective member 13 are removed to allow the fitting of the mating connector.

The connector body 11 includes a tube-shaped connector housing 111 in which connector terminals 112 are accommodated. In this embodiment, two connector terminals 112 are accommodated in the connector housing 111. Each connector terminal 112 is connected to an end of an electric wire 21 that constitutes the wire harness 2.

The cap 12 is a member formed of a plastic material 12*a* which has plasticity before being cured and which cures under a predetermined condition. In this embodiment, as the plastic material 12*a*, a dental impression material used in dentistry to make a dental mold or the like is used, and more specifically, an alginate impression material is used. The cap 12 is a member made of the plastic material 12*a* that is cured in a state where the plastic material 12*a* is removably closing the opening 111*a* of the connector housing 111 of the connector body 11 located on a side of the connector housing 111 on which the mating connector is fitted. When the connector body 11 is to be used with the mating connector fitted thereto, this cap 12 is removed and discarded.

The protective member 13 is formed of an insulating material and is positioned inside the connector housing 111 constituting the connector body 11 and on the side of the opening 111*a* such that the protective member 13 is positioned between the cap 12 and the connector terminals 112. In this embodiment, the protective member 13 is a sheet member formed of an insulating resin, and more specifically, it is a vinyl sheet formed in an oval shape that conforms with the shape of the opening 111*a* of the connector housing 111. The protective member 13 protects the connector terminals 112 from contacting the plastic material 12*a*. The protective member 13 is arranged inside the connector housing 111 with the protective member 13 adhered to an inner face portion 121 of the cap 12 that faces the connector terminals 112 inside the connector housing 111 of the connector body 11. When the connector body 11 is to be used with the mating connector fitted thereto, this protective member 13 is removed together with the cap 12 and discarded.

The connector with cap 1 according to the embodiment described above can provide the following advantageous effects. That is, as will be described later in detail, the connector with cap 1 can be obtained simply by pressing the plastic material 12*a* before being cured against the opening 111*a* of the connector body 11 to close the opening 111*a* such that the plastic material 12*a* adapts to the shape of the opening 111*a* and subsequently curing the plastic material 12*a*. Further, when the opening 111*a* is closed, the protective member 13 is arranged between the plastic material 12*a* and the connector terminals 112, thus the contact between the plastic material 12*a* and the connector terminals 112 can be prevented. Consequently, with this protective member 13, it is possible to easily prevent a conduction failure between the terminals when the mating connector is fitted due to the plastic material 12*a* before being cured contacting and adhering to the connector terminals 112. According to the configuration described above, the opening 111*a* is closed with the plastic material 12*a* having an indeterminate shape so a molding die is not required, and also, an operation process for preventing the conduction failure or the like can be performed only by pressing the plastic material 12*a* that sandwiches the protective member 13 against the opening 111*a*, thus time and effort related to manufacturing can be reduced. That is, the connector with cap 1 of this embodiment can reduce time and effort as well as cost related to manufacturing.

In this embodiment, the plastic material 12*a* is an alginate impression material which is a dental impression material. According to this configuration, since the dental impression material, particularly the alginate impression material, which is easily available and easy to handle is used as the plastic material 12*a* that forms the cap 12, it is possible to further reduce time and effort related to manufacturing.

Moreover, in this embodiment, the protective member 13 is a sheet member formed of an insulating resin. According to this configuration, since the sheet member is easy to handle, it is possible to further reduce time and effort related to the installation of the protective member 13.

Further, in this embodiment, the protective member 13 is installed inside the connector body 11 with the protective member 13 adhered to the inner face portion 121 of the cap 12. According to this configuration, it is possible to perform the formation of the cap 12 and the arrangement of the protective member 13 easily and with reduced time and effort using the method as described later that includes adhering the protective member 13 to the plastic material 12*a*, to which another member can be easily adhered before it is cured, and subsequently pressing the plastic material 12*a* against the opening 111*a*.

Next, a manufacturing method of the connector with cap 1 shown in FIG. 1 and FIG. 2 will be described.

Figure 3:
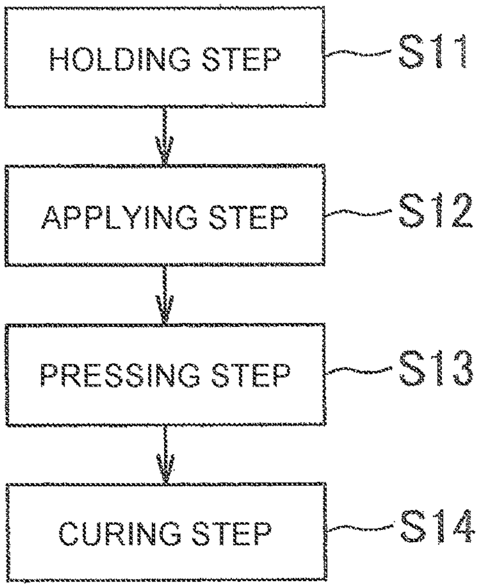
FIG. 3 is a schematic flowchart representing the flow of steps in a manufacturing method of the connector with cap shown in FIG. 1 and FIG. 2.

FIG. 3 is a schematic flowchart representing the flow of steps in the manufacturing method of the connector with cap shown in FIG. 1 and FIG. 2. Further, FIG. 4 is a schematic diagram showing how the connector with cap shown in FIG. 1 and FIG. 2 is manufactured by the manufacturing method shown in FIG. 3.

The manufacturing method of the connector with cap according to this embodiment includes a holding step S11, an applying step S12, a pressing step S13 and a curing step S14, as shown in FIG. 3.

The holding step S11 is a step of preparing a connector jig 3 described later and, just before the applying step S12, placing the connector body 11 in the connector jig 3 so that the connector body 11 is held in the connector jig 3. As shown in FIG. 4, the connector jig 3 includes a jig body portion 31 capable of holding the connector body 11, and an application plate 32 for the plastic material 12*a* attached to the jig body portion 31 so it can be opened and closed with respect to the opening 111*a* of the connector body 11.

Figure 4:
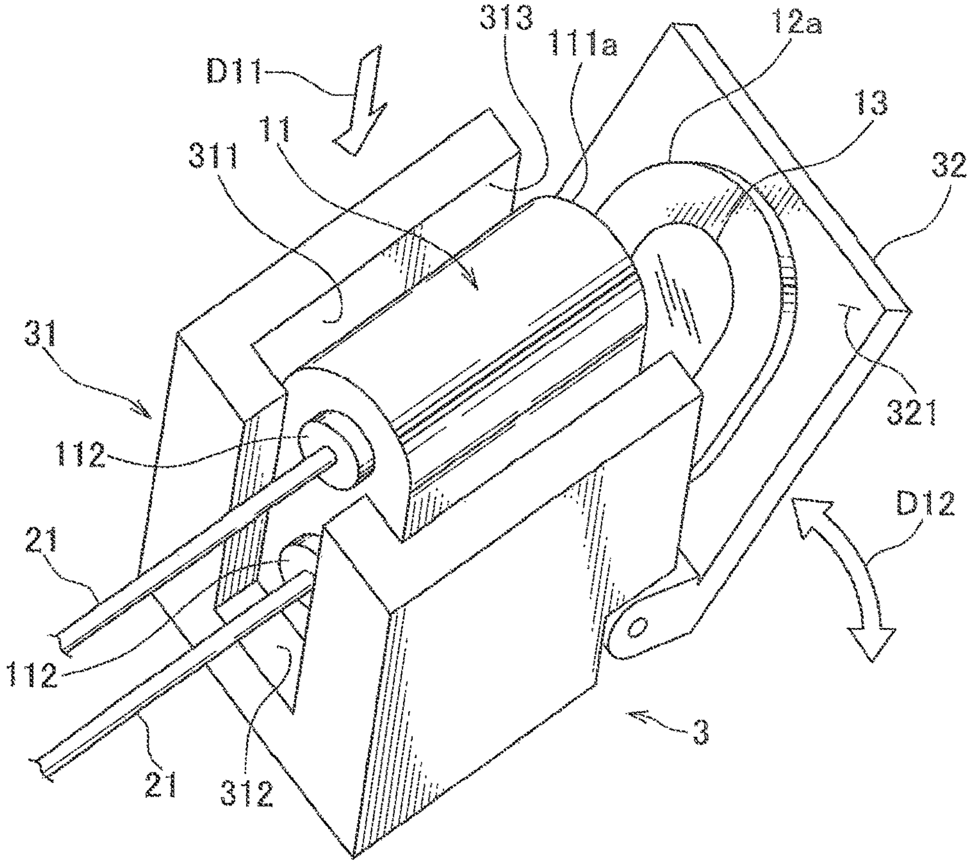
FIG. 4 is a schematic diagram showing how the connector with cap shown in FIG. 1

In this embodiment, the jig body portion 31 is a rectangular box-shaped member one side wall of which is removed to form a placing aperture 311 that allows to place the connector body 11 in a placing direction D11 shown in FIG. 4. In addition, the left side wall shown in FIG. 4 is notched to form a wire draw-out aperture 312 that is configured to draw out, from the jig body portion 31, the electric wires 21 extending from the connector terminals 112 of the connector body 11 that is placed from the placing aperture 311. Further, a side wall facing the wire draw-out aperture 312 is removed to form an opening exposing aperture 313 that exposes the opening 111*a* of the connector body 11 to the outside. The application plate 32 for the plastic material 12*a* is coupled via a hinge to an end of the opening exposing aperture 313 on a bottom wall side in a manner capable of being opened and closed in an opening-closing direction D12 shown in FIG. 4.

In the holding step S11, the connector body 11 is placed from the placing aperture 311 of the jig body portion 31 in which the application plate 32 not applied with the plastic material 12*a* is opened. Then, the electric wires 21 are drawn out from the wire draw-out aperture 312, and the connector body 11 is held in a state where the opening 111*a* is exposed from the opening exposing aperture 313.

In the next applying step S12, the plastic material 12*a* before being cured is applied on an inner face 321 of the application plate 32 that is in the opened state such that the plastic material 12*a* extends broader than the opening 111*a*. The inner face 321 is a face of the application plate 32 that faces the opening 111*a* of the connector body 11 when the application plate 32 is closed. In this embodiment, the plastic material 12*a* is applied in an oval shape to conform with the shape of the opening 111*a* of the connector body 11.

In the pressing step S13, the plastic material 12*a* before being cured applied to the application plate 32 is pressed against the opening 111*a* of the connector body 11 so as to close the opening 111*a*, with the protective member 13 arranged between the plastic material 12*a* and the connector terminals 112. In this embodiment, the pressing of the plastic material 12*a* is performed by closing the application plate 32 toward the opening exposing aperture 313. At this time, the protective member 13 is adhered to a face of the plastic material 12*a* before being cured that faces the connector terminals 112, and then the application plate 32 is closed so as to press the plastic material 12*a* to which the protective member 13 is adhered against the opening 111*a*.

The subsequent curing step S14 is a step of curing the plastic material 12*a* that has closed the opening 111*a*. In this embodiment, the alginate impression material as the plastic material 12*a* starts to cure from a point of time when it is taken out from a given container and applied to the application plate 32 and exposed to the atmosphere. In the curing step S14, the plastic material 12*a* that is closing the opening 111*a* is exposed to the atmosphere and left for a predetermined period of time, thereby the plastic material 12*a* is naturally cured. Then, in the curing step S14, the application plate 32 is removed by opening the application plate 32 after the curing, thereby completing the cap 12 that is cured in a state where the cap 12 is removably closing the opening 111*a*. With the completion of the cap 12, the connector with cap 1 is completed, and the manufacturing method of the connector with cap shown in FIG. 3 and FIG. 4 ends.

According to the manufacturing method of the connector with cap of the embodiment described with reference to FIG. 3 and FIG. 4, it is possible to manufacture the connector with cap without requiring a molding die and only by pressing the plastic material holding the protective member against the opening. Thus, the manufacturing method of the connector with cap of this embodiment can reduce time and effort as well as cost related to manufacturing.

Further, in this embodiment, the holding step S11 includes bringing the connector body 11 to be held in the jig body portion 31 of the connector jig 3, and the pressing step S13 includes closing the application plate 32 applied with the plastic material 12*a* before being cured. According to this configuration, since the connector body 11 is held in the jig body portion 31, the opening 111*a* of the connector body 11 and the plastic material 12*a* on the application plate 32 are positioned with respect to each other. The application plate 32 is then closed in this positioned state to close the opening 111*a* of the connector body 11 with the plastic material 12*a* to form the cap 12, thus the opening 111*a* can be closed with the cap 12 with high accuracy.

Further, in this embodiment, the curing step S14 includes naturally curing the plastic material 12*a* by exposing and leaving the plastic material 12*a* that is closing the opening 111*a* in an atmosphere for a predetermined period of time. According to this configuration, the plastic material is cured just by leaving it, thus time and effort related to manufacturing can be further reduced.

Further, in this embodiment, the pressing step S13 includes adhering the protective member 13 to the plastic material 12*a* before being cured and pressing the plastic material 12*a* to which the protective member 13 is adhered against the opening 111*a* of the connector body 11. According to this configuration, using the method that includes the adhesion of the protective member 13 and the subsequent pressing, it is possible to perform the formation of the cap 12 and the arrangement of the protective member 13 easily and with reduced time and effort.

The embodiments described above are only representative examples of the connector with cap and the manufacturing method of the connector with cap, and the connector with cap and the manufacturing method of the connector with cap are not limited to these embodiments. That is, the connector with cap and the manufacturing method of the connector with cap can be variously modified without departing from the gist thereof.

For example, the above-described embodiment shows, as one example of the connector with cap and the manufacturing method of the connector with cap, the connector with cap 1 as an end connector of the wire harness 2 that is arranged inside the vehicle and the manufacturing method thereof. However, the connector with cap and the manufacturing method of the connector with cap are not limited thereto, and they may be the connector with cap as an end connector of a wire harness that is arranged in a place other than a vehicle and a manufacturing method thereof, or may take other installation forms.

Further, the above-described embodiment shows, as one example of the connector with cap and the manufacturing method of the connector with cap, the connector with cap 1 including the connector body 11 in which two connector terminals 112 are accommodated in the connector housing 111 and the manufacturing method thereof. However, the connector with cap and the manufacturing method of the connector with cap are not limited thereto. That is, specific aspects of the connector such as the number of the accommodated connector terminals may be set arbitrary.

In addition, the above-described embodiment shows, as one example of the plastic material, the dental impression material, and more specifically, the plastic material 12*a* that is the alginate impression material. However, the plastic material is not limited thereto, and a material other than the dental impression material such as an ultraviolet curable resin or the like may be used, as long as it is a material that has plasticity before being cured and that cures under a predetermined condition. Further, even in the case where the dental impression material is used, a material other than the alginate impression material such as a silicone impression material or the like may be used. However, the dental impression material, particularly the alginate impression material, is easily available and easy to handle as described above.

Further, the above-described embodiment shows, as one example of the protective member, the protective member 13 that is the sheet member formed of an insulating resin. However, the protective member is not limited thereto, it may be a member other than the sheet member such as a plate member or a block member. However, according to the protective member 13 that is the sheet member, it is possible to further reduce time and effort related to installation thanks to its ease of handling as described above.

Further, the above-described embodiment shows, as one example of the protective member, the protective member 13 adhered to the inner face portion 121 of the cap 12. However, the protective member is not limited thereto, it may be arranged distant from the inner face portion of the cap as long as it is positioned between the cap and the connector terminals. However, by adhering the protective member 13 to the cap 12, the formation of the cap 12 and the arrangement the protective member 13 can be performed easily with reduced time and effort as described above.

Further, the above-described embodiment shows, as one example of the manufacturing method of the connector with cap, a method including the holding step S11 of bringing the connector body 11 to be held in the connector jig 3. However, the manufacturing method of the connector with cap is not limited thereto, that is, it may not use the connector jig and such, and an operator may hold the connector body with one hand and press the plastic member applied on the application plate against the opening with the other hand. However, by using the connector jig 3, the opening 111*a* of the connector body 11 and the plastic material 12*a* can be positioned with respect to each other, and thus the opening 111*a* can be closed with the cap 12 with high accuracy, as described above.

Further, the above-described embodiment shows, as one example of the holding step, the holding step S11 that is performed just before the applying step S12. However, the holding step is not limited thereto and it may be performed just after the applying step.

In addition, the above-described embodiment shows, as one example of the curing step, the curing step S14 of naturally curing the plastic material. However, the curing step is not limited thereto, it may be, for example, a step of using an ultraviolet curing resin as the plastic material and performing ultraviolet irradiation to perform curing. However, the curing step S14 that involves the natural curing can further reduce time and effort related to manufacturing as described above.

Further, the above-described embodiment shows, as one example of the pressing step, the pressing step S13 of pressing the plastic material 12*a* to which the protective member 13 is adhered against the opening 111*a* of the connector body 11. However, the pressing step is not limited thereto, it may be, for example, a step of placing the protective member inside the connector body without adhering it to the plastic material and pressing the plastic material against the opening. However, according to the pressing step S13 that involves pressing the plastic material 12*a* to which the protective member 13 is adhered, it is possible to perform the formation of the cap 12 and the arrangement of the protective member 13 easily and with reduced time and effort as described above.

LIST OF REFERENCE SIGNS

1 connector with cap
2 wire harnesses
3 connector jig
11 connector body
12 cap
12*a* plastic material
13 protective member
21 electric wire
111 connector housing
111*a* opening
112 connector terminal
121 inner face portion
31 jig body portion
32 application plate
311 placing aperture
312 wire draw-out aperture
313 opening exposing aperture
D11 placing direction
D12 opening-closing direction
S11 holding step
S12 applying step
S13 pressing step
S14 curing step

What is claimed is:

1. A connector with cap comprising:
a connector body that includes a tube-shaped connector housing in which a connector terminal is accommodated;
a cap formed of a plastic material that has plasticity before being cured and that cures under a predetermined condition, the cap being cured in a state where the cap is removably closing an opening of the connector body located on a side on which a mating connector is fitted; and
a protective member formed of an insulating material and arranged inside the connector body on a side of the opening such that the protective member is positioned between the cap and the connector terminal, the protective member being configured to protect the connector terminal from contacting the plastic material,
wherein the plastic material is a dental impression material.

2. The connector with cap according to claim 1, wherein the plastic material is an alginate impression material.

3. The connector with cap according to claim 1, wherein the protective member is a sheet member formed of an insulating resin.

4. The connector with cap according to claim 1, wherein the protective member is arranged inside the connector body with the protective member adhered to an inner face portion of the cap, the inner face portion facing the connector terminal inside the connector body.

5. The connector with cap according to claim 1, wherein before being cured, the dental impression material as the plastic material is applied on an application plate to be in a state in which the dental impression material extends broader than the opening of the connector body, the connector body including the tube-shaped connector housing in which the connector terminal is accommodated, the opening being located on a side of the connector body on which the mating connector is fitted.

6. A manufacturing method of a connector with cap, comprising:
an applying step of applying, on a given application plate, a plastic material that has plasticity before being cured and that cures under a predetermined condition such that the plastic material extends broader than an opening of a connector body, the plastic material being applied in a state before being cured, the connector body including a tube-shaped connector housing in which a connector terminal is accommodated, the opening being located on a side of the connector body on which a mating connector is fitted;
a pressing step of pressing the plastic material before being cured applied to the application plate against the opening of the connector body so as to close the opening in a state where a protective member is arranged between the plastic material and the connector terminal, the protective member being formed of an insulating material and being configured to protect the connector terminal from contacting the plastic material; and
a curing step of curing the plastic material that is closing the opening and removing the application plate, thereby completing a cap that is cured in a state where the cap is removably closing the opening.

7. The manufacturing method according to claim 6, further comprising a holding step of preparing a connector jig that includes a jig body portion capable of holding the connector body and then, just before or just after the applying step, bringing the connector body to be held in the jig body portion of the connector jig, the application plate being attached to the jig body portion so as to be capable of being opened and closed with respect to the opening of the connector body, and wherein the pressing step includes closing, with respect to the opening, the application plate on which the plastic material before being cured is applied, with the protective member arranged between the plastic material and the connector terminal.

8. The manufacturing method according to claim 6, wherein the curing step includes naturally curing the plastic material that is closing the opening by exposing the plastic material to atmosphere and leaving it for a predetermined period of time.

9. The manufacturing method according to claim 6 wherein the pressing step includes adhering the protective member to a face of the plastic material before being cured applied on the application plate, the face facing the connector terminal, and pressing the plastic material to which the protective member is adhered against the opening.

* * * * *